: 3,005,030
Patented Oct. 17, 1961

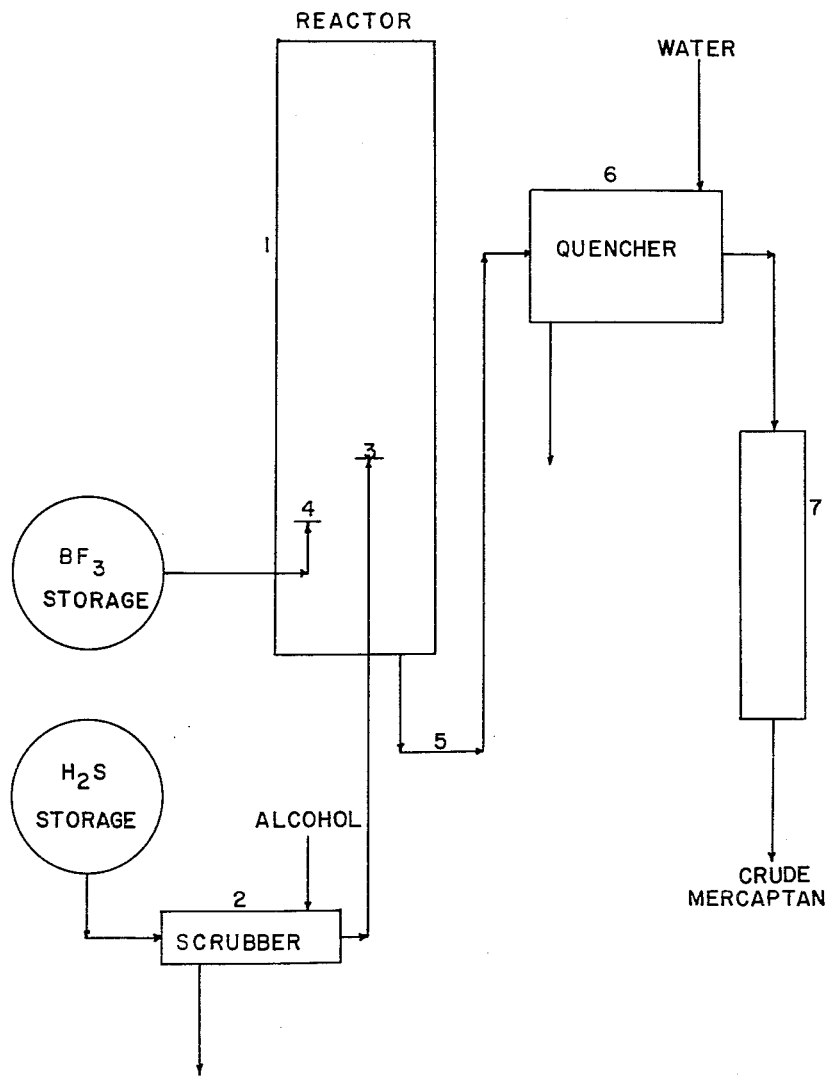

3,005,030
MANUFACTURE OF SULFUR COMPOUNDS
Jacques D. Robinson, El Dorado, Ark., assignor to Monsanto Chemical Company, St. Louis, Mo., a corporation of Delaware
Filed June 3, 1959, Ser. No. 817,854
19 Claims. (Cl. 260—609)

This invention relates to the manufacture of organic sulfur compounds and more particularly to the preparation of alkyl mercaptans.

The synthesis of alkyl mercaptans by the addition of hydrogen sulfide to olefinic materials in the presence of a catalyst is well known in the art. The more significant processes of commercial importance generally utilize rather extreme reaction conditions, for example, either exceedingly low temperatures or extremely high pressures. A process characterized by a rapid and complete reaction under relatively mild temperature and pressure conditions has not become a commercial reality.

It is an object of this invention to provide an improved process for the preparation of alkyl mercaptans. It is a particular object of this invention to provide an improved process for the production of alkyl mercaptans by the catalytic reaction of hydrogen sulfide with olefins under relatively mild conditions of temperature and pressure. Additional objects will become apparent from the description of this invention.

It has now been discovered that excellent yields of alkyl mercaptans can be obtained by reacting an olefin with hydrogen sulfide in the presence of a catalyst comprising boron trifluoride and a monohydric alcohol. The process is characterized by the production of extremely high yields of the desired alkyl mercaptan under relatively mild conditions of temperature and pressure.

FIGURE 1 is a schematic drawing of a reaction system which is particularly suited for carrying out the novel process of this invention.

In this system, the olefin is placed in reactor 1. $H_2S$ is passed through the alcohol scrubber 2 picking up the desired quantities of alcohol and the alcohol containing $H_2S$ is then passed into the reactor through diffuser 3. $BF_3$ is introduced into the reactor through diffuser 4. The crude mercaptan is removed from the reactor through line 5 into tank 6 which contains water to quench the catalyst. The crude mercaptan layer is allowed to separate from the water and is then passed through a glass wool coalescer 7 to remove any entrained water. The crude material is then purified, if desired, by distillation. The following examples illustrate the novel process of this invention utilizing the system described in FIGURE 1.

*Example I*

Using the system shown in FIGURE 1, the reactor was charged with 100 ml. of propylene tetramer. $H_2S$ was bubbled through the methanol filled scrubber at room temperature into the olefin at the rate of 0.1 liter per minute. $BF_3$ was charged to the reactor through a separate line at the rate of 3 ml. per minute. The $H_2S:BF_3$ molar ratio was about 33:1 and the methanol:$BF_3$ molar ratio was about 1:1. The initial reaction temperature was 25° C. and it rose to approximately 60° C. during the reaction. At the end of 2 hours, the reaction mixture was quenched with water and the crude product was found to contain 14.0% SH or about 86.3% dodecyl mercaptan.

*Example II*

Utilizing the reactor system set forth in FIGURE 1, the reactor was charged wih 200 ml. of a tetrapropylene. $H_2S$ was bubbled through the reactor at room temperature into the olefin at the rate of 1 liter per minute, with the exception in this case, however, that the $H_2S$ did not first pass through the methanol scrubber. $BF_3$ was charged to the reactor at the rate of 20 ml. per minute. The $H_2S:BF_3$ molar ratio was about 50:1. The initial reaction temperature was 25° C. and rose to 55 C. during the reaction. At the end of 25 minutes, the reaction mixture was quenched in water and the crude product was found to contain only 4.2% SM. A significant quantity of $H_2S$ passed through the olefin unreacted.

*Example III*

The procedure set forth in Example I is repeated using as the olefin a 338° C–360° F. cut of heavy polymer from a catalytic polymerization unit charging refinery propylene and butylenes. An excellent yield of the corresponding mercaptan is obtained with substantially complete single pass consumption of $H_2S$ fed.

*Example IV*

The procedure set forth in Example I is repeated using as the olefin a natural gasoline fraction containing about 15 weight percent triisobutylene. An excellent yield of triisobutyl mercaptan is obtained with substantially complete single pass consumption of $H_2S$ fed.

*Example V*

The procedure set forth in Example I is repeated using cyclohexene as the olefin. An excellent yield of cyclohexyl mercaptan is obtained with substantially complete single pass consumption of the $H_2S$.

*Example VI*

The procedure set forth in Example I is repeated with the exception that ethanol is used in the alcohol scrubber instead of methanol. An excellent yield of dodecyl mercaptan is obtained.

*Example VII*

The procedure set forth in Example I is repeated with the exception that isopropanol is placed in the alcohol scrubber instead of methanol. An excellent yield of dodecyl mercaptan is obtained.

*Example VIII*

The procedure set forth in Example IV is repeated with the exception that n-butanol is placed in the alcohol scrubber instead of methanol. An excellent yield of triisobutyl mercaptain is obtained.

*Example IX*

The procedure set forth in Example V is repeated with the exception that 2-methylpentyl alcohol is placed in the alcohol scrubber instead of methanol. An excellent yield of cyclohexyl mercaptan is obtained.

*Example X*

The procedure set forth in Example I is repeated with the exception that 2-ethylhexyl alcohol is placed in the alcohol scrubber instead of methanol. An excellent yield of dodecyl mercaptan is obtained.

A comparison of the results obtained in Examples I and II clearly illustrates the improvements obtained using the process of this invention employing a catalyst system comprising boron trifluoride and an alkyl alcohol. The boron trifluoride-monohydric alkyl alcohol catalyst system used in the novel process of this invention can be prepared and/or introduced into the reaction system in any manner particularly convenient to those skilled in the art. The examples have illustrated the technique of introducing the boron trifluoride and the monohydric alkyl alcohol as separate compounds, forming the catalyst system in situ. If convenient, the boro trifluoride and the alcohol can be mixed separately and then added to the reaction system. Additionally, either the boro trifluoride or the alkyl alcohol can be added to the olefin and the other introduced as a separate stream or in combination with the $H_2S$. The particular manner in which the catalyst system is formed is not a critical factor in the practice of the novel process of this invention.

The ratio of $BF_3$ to the monohydric alcohol in the catalyst system employed in the novel process of this invention is subject to substantial variation. Preferably the catalyst system is employed in the molar ratio of alcohol:$BF_3$ of from about 0.5:1 to about 2:1. Higher or lower ratios can be employed if desired but best results are obtained if the molar ratio is maintained within the range just hereinbefore specified. The quantity of catalyst system used in the novel process of this invention is also subject to wide variations. Generally boron trifluoride is employed in the molar ratio of $H_2S:BF_3$ of from about 10:1 to about 100:1. A characteristic of this process is the substantially single pass conversion of the $H_2S$. Thus, the ability to employ substantially stoichiometric quantities of $H_2S$ and the olefin is a particular advantage of the novel process of this invention. In practicing the novel process of this invention, the quantity of $H_2S$ employed is not, however, a critical factor. $H_2S$ can be employed in either an extreme deficient amount or in an extreme excess, if for any reason circumstances dictate such extremes.

The reaction temperature employed in the novel process of this invention is also subject to substantial variations. Temperatures in the range of from about 20° C. to about 100° C. have been found to be particularly applicable. Temperatures below 20° C. can be used if desired, the low temperatures applicable being dictated solely by the freezing point of the particular reaction mixture. Higher temperatures can be employed if desired when dictated by the particular circumstances. A reaction temperature maintained in the range of approximately 55° C. to about 95° C. has been found to be particularly advantageous. The reaction is conveniently carried out at atmospheric pressure although pressures above or below atmospheric can be used if desired in a particular case. Reaction pressure is not a critical factor in the practice of the novel process of this invention.

The examples have illustrated carrying out the novel process of this invention according to batch methods. The invention is not limited to this mode of operation as continuous techniques can be employed if desired. The particular method of effecting contact between the $H_2S$ and the olefin in the presence of the catalyst system described herein is not a critical factor in the practice of this invention. The crude alkyl mercaptan obtained from this process can be purified by any technique well known to those skilled in the art. Water washing of the crude material followed by fractional distillation is a particular economic and simple technique to be employed.

In preparing the novel catalyst systems of this invention, any monohydric alcohol can be used in the process of this invention. Alkyl alcohols containing from 1 to 18 carbon atoms are useful with the alkyl alcohols containing from 1 to 8 carbon atoms being particularly preferred. Methyl, ethyl, propyl, isopropyl, n-butyl, isobutyl, sec.-butyl tert.-butyl, pentyl, n-hexyl, 2-methylpentyl, n-heptal, n-octyl, isooctyl and 2-ethylhexyl alcohols have particular utility in the practice of this process.

The olefins which may be reacted with $H_2S$ in accordance with this invention include those which contain one or more olefinic unsaturations between two aliphatic carbon atoms regardless of the class or characteristic of the compound containing such linkage. Such hydrocarbons can also contain substituent groups which are inert under the reaction conditions. Examples of olefins which can be used in this process are ethylene, propylene, butylenes, pentenes, hexenes, cyclohexene, 1-methylcyclohexene-1; propylene trimers, propylene tetramers and propylene pentamers; diisobutylenes such as 2,4,4-trimethylpentene-1, and 2,4,4-trimethylpentene-2, octene-1 and -2; triisobutylenes such as 2,2,4,6,6-pentamethylheptene-3, dodecene-1 and -2, 2-n-pentyl-4,4-dimethylpentene-1, 2,4,4, 6,6-pentamethylheptene-2 and -1; 1,4-diphenylbutene-2; tetraisobutylenes such as cetene-1 and -2; and their homologues and analogues. The olefins can be used as such or can be mixed with inert hydrocarbons.

What is claimed is:

1. A process for preparing alkyl mercaptans which comprises reacting an olefin with $H_2S$ in the presence of a catalyst system comprising $BF_3$ and a monohydric alkyl alcohol containing from 1 to 18 carbon atoms.

2. A process for preparing alkyl mercaptans which comprises reacting an olefin with $H_2S$ in the presence of a catalyst system comprising $BF_3$ and a monohydric alkyl alcohol containing from 1 to 8 carbon atoms.

3. A process for preparing alkyl mercaptans which comprises reacting an olefin with $H_2S$ in the presence of a catalyst system comprising $BF_3$ and a monohydric alkyl alcohol containing from 1 to 8 carbon atoms, said $BF_3$ being employed in the molar ratio of $H_2S:BF_3$ of from about 10:1 to about 100:1 and the monohydric alkyl alcohol being employed in the molar ratio of alcohol:$BF_3$ of from about 0.5:1 to about 2:1.

4. The process as described in claim 3 wherein the monohydric alkyl alcohol is methanol.

5. The process as described in claim 3 wherein the monohydric alkyl alcohol is ethanol.

6. The process as described in claim 3 wherein the monohydric alkyl alcohol is isopropanol.

7. The process as described in claim 3 wherein the monohydric alkyl alcohol is n-butanol.

8. The process as described in claim 3 wherein the monohydric alkyl alcohol is 2-ethylhexanol.

9. The process as described in claim 3 wherein the reaction is carried out at a temperature in the range of from about 20° C. to about 100° C.

10. The process as described in claim 9 wherein the monohydric alkyl alcohol is methanol.

11. The process as described in claim 9 wherein the monohydric alkyl alcohol is ethanol.

12. The process as described in claim 9 wherein the monohydric alkyl alcohol is isopropanol.

13. The process as described in claim 9 wherein the monoalkyl alcohol is n-butanol.

14. The process as described in claim 9 wherein the monohydric alkyl alcohol is 2-ethylhexanol.

15. A process for preparing alkyl mercaptans which comprises reacting a propylene polymer with $H_2S$ in the presence of a catalyst system comprising $BF_3$ and a monohydric alkyl alcohol containing from 1 to 18 carbon atoms.

16. A process for preparing alkyl mercaptans which comprises reacting a propylene polymer with $H_2S$ in the presence of a catalyst system comprising $BF_3$ and a monohydric alkyl alcohol containing from 1 to 8 carbon atoms.

17. A process for preparing alkyl mercaptans which comprises reacting a propylene polymer with $H_2S$ in the presence of a catalyst system comprising $BF_3$ and a monohydric alkyl alcohol containing from 1 to 8 carbon atoms, said $BF_3$ being employed in the molar ratio of $H_2S:BF_3$ of from about 10:1 to about 100:1 and the monohydric alkyl alcohol being employed in the molar ratio of alcohol:$BF_3$ of from about 0.5:1 to about 2:1.

18. The process as described in claim 17 wherein the reaction is carried out at a temperature in the range of from about 20° C. to about 100° C.

19. The process as described in claim 18 wherein the propylene polymer is a propylene tetramer and the monohydric alkyl alcohol is methanol.

No references cited.

UNITED STATES PATENT OFFICE
CERTIFICATE OF CORRECTION

Patent No. 3,005,030  October 17, 1961

Jacques D. Robinson

It is hereby certified that error appears in the above numbered patent requiring correction and that the said Letters Patent should read as corrected below.

Column 1, line 70, for "wih" read -- with --; column 2, line 8, for "SM" read -- SH --; line 13, strike out "C"; column 4, line 46, for "monoalkyl" read -- monohydric alkyl --.

Signed and sealed this 19th day of June 1962.

(SEAL)
Attest:

ERNEST W. SWIDER
Attesting Officer

DAVID L. LADD
Commissioner of Patents